(12) United States Patent  
Haltiner, Jr.

(10) Patent No.: US 6,627,339 B2  
(45) Date of Patent: Sep. 30, 2003

(54) FUEL CELL STACK INTEGRATED WITH A WASTE ENERGY RECOVERY SYSTEM

(75) Inventor: Karl J. Haltiner, Jr., Fairport, NY (US)

(73) Assignee: Delphi Technologies, Inc., Troy, MI (US)

( * ) Notice: Subject to any disclaimer, the term of this patent is extended or adjusted under 35 U.S.C. 154(b) by 334 days.

(21) Appl. No.: 09/838,661

(22) Filed: Apr. 19, 2001

(65) Prior Publication Data

US 2001/0049039 A1 Dec. 6, 2001

Related U.S. Application Data

(60) Provisional application No. 60/198,357, filed on Apr. 19, 2000, and provisional application No. 60/201,568, filed on May 1, 2000.

(51) Int. Cl.[7] .............................................. H01M 8/04
(52) U.S. Cl. .......................... 429/17; 429/13; 429/14; 429/26; 429/32; 429/34; 429/38; 429/39
(58) Field of Search .............................. 429/26, 32, 34, 429/38, 39, 13, 14, 17

(56) References Cited

U.S. PATENT DOCUMENTS

| | | | |
|---|---|---|---|
| 5,413,879 A | 5/1995 | Domeracki et al. | 429/30 |
| 5,612,149 A | 3/1997 | Hartvigsen et al. | 429/26 |
| 5,750,278 A | 5/1998 | Gillett et al. | 429/24 |
| 6,077,620 A | 6/2000 | Pettit | 429/26 |
| 6,132,895 A * | 10/2000 | Pratt et al. | 429/39 |
| 6,232,005 B1 | 5/2001 | Pettit | 429/19 |
| 6,280,864 B1 | 8/2001 | Towler et al. | 429/17 |
| 6,326,095 B1 | 12/2001 | Kneidel | 429/19 |
| 6,387,555 B1 * | 5/2002 | Wheeler et al. | 429/17 |
| 6,403,247 B1 | 6/2002 | Guthrie et al. | 429/34 |
| 6,440,596 B1 | 8/2002 | Ruhl et al. | 429/34 |
| 6,451,466 B1 * | 9/2002 | Grasso et al. | 429/20 |
| 6,458,477 B1 * | 10/2002 | Hsu | 429/17 |
| 6,465,118 B1 * | 10/2002 | Dickman et al. | 429/20 |
| 6,479,177 B1 * | 11/2002 | Roberts et al. | 429/13 |
| 6,485,852 B1 * | 11/2002 | Miller et al. | 429/17 |
| 6,541,148 B1 * | 4/2003 | Walsh et al. | 429/39 |
| 6,562,496 B2 * | 5/2003 | Faville et al. | 429/13 |
| 6,562,502 B2 * | 5/2003 | Haltiner, Jr. | 429/25 |

* cited by examiner

*Primary Examiner*—Bruce F. Bell
(74) *Attorney, Agent, or Firm*—Jimmy L. Funke

(57) ABSTRACT

A fuel cell comprising a fuel cell stack portion integrally connected to a waste energy recovery portion by a distribution manifold is presented. The fuel cell stack portion has supply and exhaust openings. The waste energy recovery portion has flow channels defined therein, and supply and exhaust openings. The distribution manifold integrally connects the fuel cell stack portion with the waste energy recovery portion. The distribution manifold has supply and exhaust passages therethrough, with the supply passages interconnecting the supply openings of the fuel cell stack portion with the supply openings of the waste energy recovery portion and the exhaust passages interconnecting the exhaust openings of the fuel cell stack portion with the exhaust opening of the waste energy recovery portion.

10 Claims, 2 Drawing Sheets

FUEL CELL STACK INTEGRATED WITH A WASTE ENERGY RECOVERY SYSTEM

CROSS-REFERENCE TO RELATED APPLICATION

The present application claims the benefit of the filing date of U.S. Provisional Application No. 60/198,357, filed on Apr. 19, 2000, and U.S. Provisional Application No. 60/201,568, filed on May 1, 2000, the entire contents of which are incorporated herein by reference.

BACKGROUND OF THE INVENTION

Alternative transportation fuels have been represented as enablers to reduce toxic emissions in comparison to those generated by conventional fuels. At the same time, tighter emission standards and significant innovation in catalyst formulations and engine controls has led to dramatic improvements in the low emission performance and robustness of gasoline and diesel engine systems.

One approach to addressing the issue of emissions is the employment of fuel cells, particularly solid oxide fuel cells ("SOFC"), in an automobile. A fuel cell is an energy conversion device that converts chemical energy into electrical energy. The fuel cell generates electricity and heat by electrochemically combining a gaseous fuel, such as hydrogen, carbon monoxide, or a hydrocarbon, and an oxidant, such as air or oxygen, across an ion-conducting electrolyte. The fuel cell generally consists of two electrodes positioned on opposite sides of an electrolyte. The oxidant passes over the oxygen electrode (cathode) while the fuel passes over the fuel electrode (anode), generating electricity, water, and heat.

A SOFC is constructed entirely of solid-state materials, utilizing an ion conductive oxide ceramic as the electrolyte. The electrochemical cell in a SOFC is comprises an anode and a cathode with an electrolyte disposed therebetween. The components of an electrochemical cell and a SOFC are rigid and extremely fragile since they are produced from brittle materials.

In operation, a SOFC system generates electricity and heat by this electrochemical process of combining a fuel and an oxidant. The fuel (e.g., reformate) provided to the SOFC is produced in a reformer. Byproducts from the SOFC, a supply of oxidant, and a supply of reformate can be directed through a discrete waste energy recovery unit. The waste energy recovery unit is a device that converts chemical energy and thermal energy into input thermal energy for the SOFC system. This is accomplished with heat exchangers. Unlike a SOFC, the waste energy recovery unit comprises durable and heat transferable materials. These waste energy recovery units have many tubes and connections for directing the chemical and thermal energy through the large unit.

SUMMARY OF THE INVENTION

The above-discussed and other drawbacks and deficiencies of the prior art are overcome or alleviated by a fuel cell system including a fuel cell stack portion integrally connected with a waste energy recovery portion by a distribution manifold. The fuel cell stack portion has supply and exhaust openings, for the anode and the cathode thereof. The waste energy recovery portion has flow channels defined therein, and supply and exhaust openings. The distribution manifold integrally connects the fuel cell stack portion with the waste energy recovery portion. The distribution manifold has supply and exhaust passages therethrough, with the supply passages interconnecting the supply openings of the fuel cell stack portion with the supply openings of the waste energy recovery portion and the exhaust passages interconnecting the exhaust openings of the fuel cell stack portion with the exhaust opening of the waste energy recovery portion. The anode and cathode gasses are heated in the waste energy recovery portion.

The above described and other features are exemplified by the following figures and detailed description.

BRIEF DESCRIPTION OF THE DRAWINGS

Referring now to the figures, wherein like elements are numbered alike in the several FIGURES.

DESCRIPTION OF THE PREFERRED EMBODIMENT

Although described in connection with a SOFC, it is to be understood that a fuel cell having a fuel cell stack portion integrated with waste energy recovery portion can be employed with any type of fuel cell such as a SOFC, PEM, phosphoric acid, molten carbonate, and the like.

Figure 1:
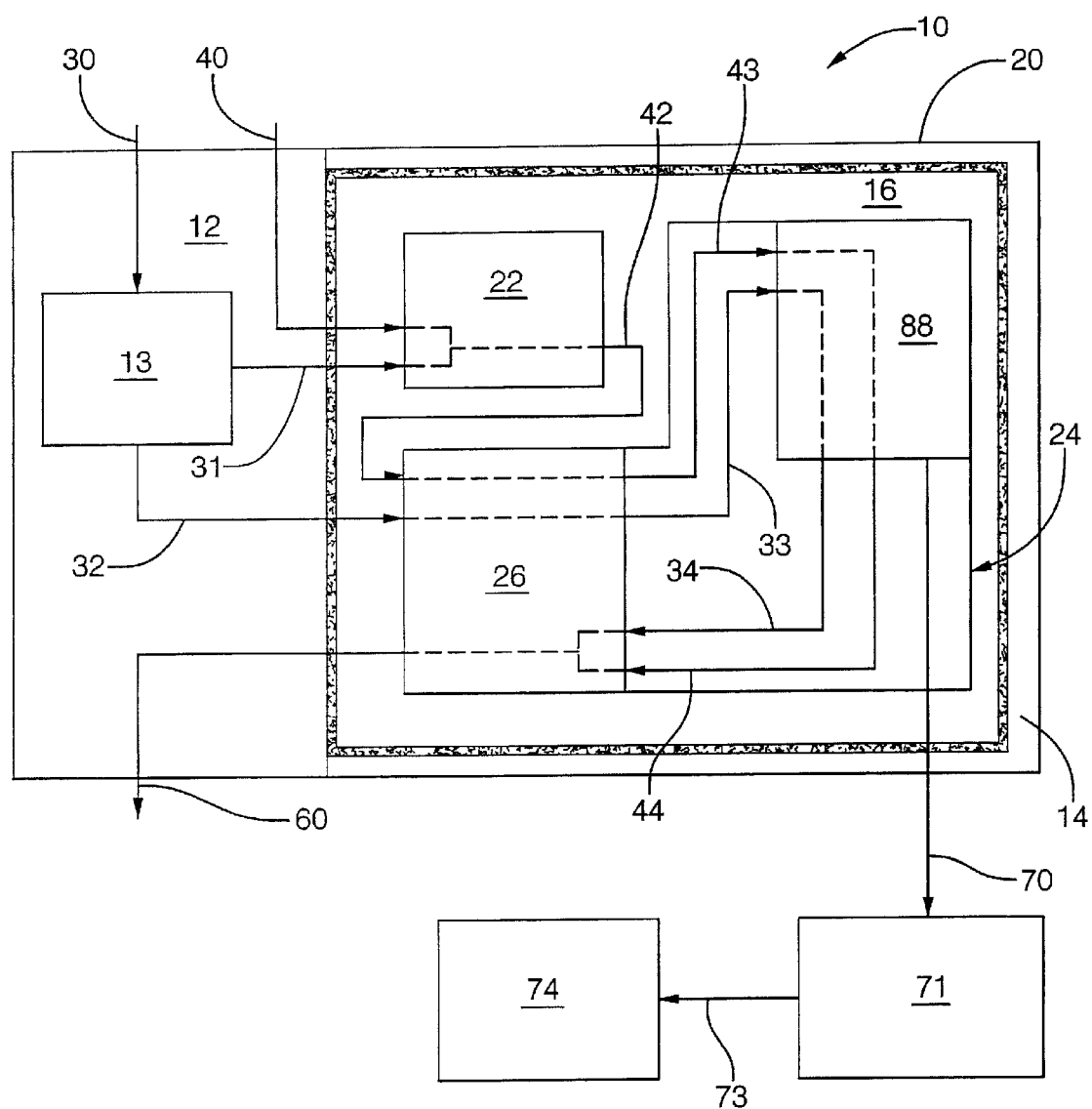
FIG. 1 is a schematic of an fuel cell system.

Referring now to FIG. 1, a mechanization of a fuel cell system 10 is schematically depicted. A system enclosure 20 comprises a main plenum chamber 12, an insulation plenum chamber 14 and a hot box chamber 16. The hot box chamber 16 includes a reformer system 22 and a fuel cell 24. The fuel cell 24 includes a fuel cell stack portion 88 and an integrally connected waste energy recovery portion (or heat exchanger) 26. A supply of air 30, exterior to the system enclosure 20, provides air to a process air supply section 13 located within the main plenum chamber 12. The process air supply section 13 can be a main blower (not shown) and air control valves (not shown). A supply of fuel 40, exterior to the system enclosure 20, provides fuel to the fuel cell system 10. The fuel can be provided via fuel injectors (not shown) located within the main plenum chamber 12, as is known. The supply of fuel 40 and a flow of air 31 are directed to the reformer system 22. Distribution of a reformate 42 from the reformer system 22 can be accomplished with a reformate control valve, as described below, controlled by an electrical actuator (not shown). The supply (or stream) of reformate 42 created in the reformer system 22 is directed to the waste energy recovery portion 26 of the fuel cell 24.

The waste energy recovery portion 26 of the fuel cell 24 receives an anode supply (e.g., reformate) 42 and a cathode supply (i.e., oxidant air or the like) 32 that are preferably heated in the waste energy recovery portion 26. The heated anode supply 43 and heated cathode supply 33 are then directed to the fuel cell stack portion 88. To aid in heating the anode supply 42 and cathode supply 32, the waste energy recovery portion 26 recovers the heated anode exhaust 34 and cathode exhaust 44 from the fuel cell stack portion 88. A flow of reaction byproducts (e.g., water, carbon dioxide, and the like) 60 is discharged from the waste energy recovery portion 26 to the exterior environment.

The fuel cell stack portion 88 in this exemplary embodiment is a solid oxide fuel cell (SOFC) having a multilayer ceramic/metal composite structure designed to produce an electrical signal 70 at an operating temperature of about 600° C. to about 1,000° C. The fuel cell stack portion 88 comprises one or more multi-cell modules that are mounted to a common gas distribution manifold. Each module of the fuel cell stack portion 88 produces a specific voltage that is a function of the number of cells in the module. Electrical attachment of the fuel cell portion 88 is accomplished by way of electrodes at the base and top of each module that lead out of the hot box 16 and system enclosure 20 to a vehicle power bus and system (not shown). The output voltage and current is controlled by the combination of these modules in series and parallel electrical connections, the air/fuel control system, and the electric load applied to the fuel cell system 10.

The electrical signal 70 is presented to power electronics system 71 (which includes system controllers and a battery, e.g., LiPo battery or the like) of a vehicle (not shown). This processed electric signal is then presented by a signal line 73 to electrical loads 74 of the vehicle.

To facilitate the reaction in the fuel cell, a direct supply of fuel, such as hydrogen, carbon monoxide, or methane, is preferred. However, concentrated supplies of these fuels are generally expensive and difficult to supply. Therefore, the specific fuel can be supplied by processing a more complex source of the fuel. The fuel utilized in the system is typically chosen based upon the application, expense, availability, and environmental issues relating to the fuel. Suitable fuels include fuels such as hydrocarbon fuels, which include, but are not limited to, liquid fuels, such as gasoline, diesel, ethanol, methanol, kerosene, and others; conventional gaseous fuels, such as natural gas, propane, butane, and others; and alternative fuels, such as hydrogen, biofuels, dimethyl ether, and others; and synthetic fuels, such as synthetic fuels produced from methane, methanol, coal gasification or natural gas conversion to liquids, and others; and combinations comprising at least one of the foregoing fuels. The preferred fuel is typically based upon the power density of an engine, with lighter fuels (i.e., those which can be more readily vaporized and/or conventional fuels which are readily available to consumers) generally preferred.

The processing (or reforming) of hydrocarbon fuels, such as gasoline, is completed to provide an immediate fuel source for rapid start up of the solid oxide fuel cell, as well as protecting the solid oxide fuel cell by removing impurities. Fuel reforming in the reformer system 22 (which preferably includes a main reformer and, optionally, a micro-reformer) is used to convert a hydrocarbon (such as gasoline) or an oxygenated fuel (such as methanol) into the reformats (e.g., hydrogen and carbon monoxide) and byproducts (e.g., carbon dioxide and water). Common approaches include steam reforming, partial oxidation, dry reforming, and the like, as well as combinations comprising at least one of the foregoing approaches, all of which are known.

The waste energy recovery portion 26 of fuel cell 24 converts the unused chemical energy (reformate) and thermal energy (exothermic reaction heat from the fuel cell stack portion 88) to input thermal energy for the fuel cell system 10 through the use of an integration of catalytic combustion zones and heat exchangers. Air is supplied to the waste energy recovery portion 26 from the process air supply section 13 in the main plenum 12. The waste energy recovery portion 26 receives fuel from two sources during operation. During the early part of start-up, low-grade reformate from the reformer system 22 is routed, with a supply of air, directly to the waste energy recovery portion 26 catalytic combustor. During normal operation, reformate is directed through the waste energy recovery portion 26 heat exchangers to the fuel cell stack portion 88. The output of the fuel cell stack portion 88, anode exhaust 44 and cathode exhaust 34 is routed back to the waste energy recovery portion 26 catalytic combustor to be mixed and catalyzed. The catalytic combustion zones heat the integrated heat exchangers of the waste energy recovery portion 26.

Figure 2:
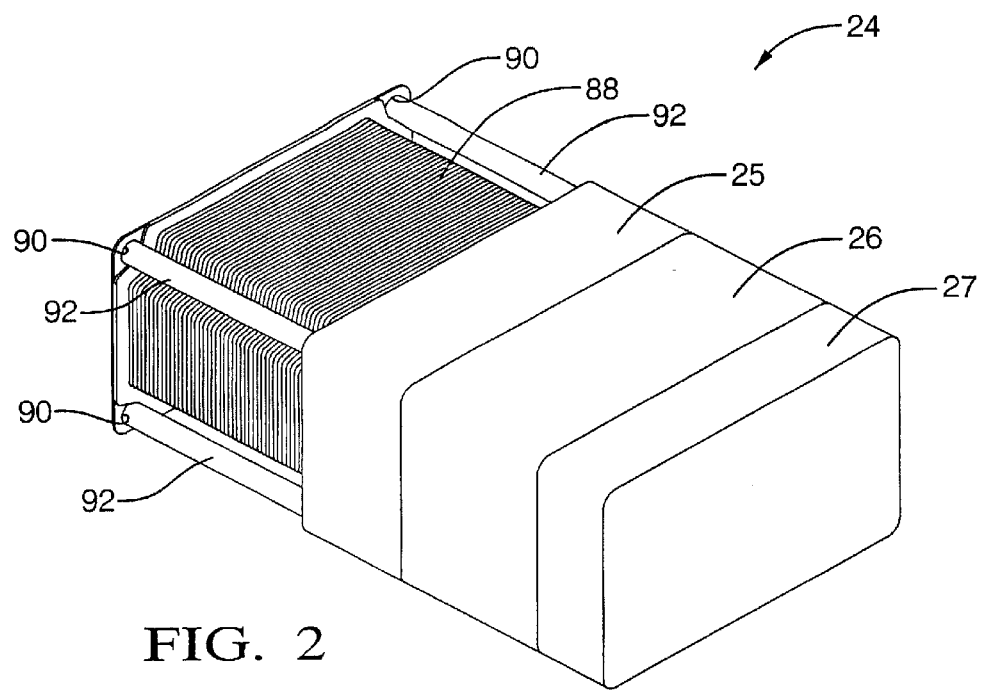
FIG. 2 is a perspective view of a fuel cell having a fuel cell stack portion integrally connected with a waste energy recovery portion.

Referring now to FIG. 2, the fuel cell 24 comprises an integral assembly of a fuel cell stack portion 88, a distribution manifold 25, the waste energy recovery portion 26, and an inlet/outlet manifold 27. The fuel cell stack portion 88 has a plurality of opening 90 with each of the distribution manifold 25, the waste energy recovery portion 26, and the inlet/outlet manifold 27 having a plurality of corresponding openings (not shown). A plurality of bolts (fasteners) 92 extend through these openings to integrally retain the fuel cell stack portion 88, the distribution manifold 25, the waste energy recovery portion 26, and the inlet/outlet manifold 27 together. The inlet/outlet manifold's openings are preferably tapped to engage the bolts 92. Alternatively, these openings in the inlet/outlet manifold may pass through and nuts (not shown) may be used to engage the bolts 92 to retain the fuel cell. The inlet/outlet manifold 27 routes oxidant, reformate and exhaust between the fuel cell system 10 itself and the fuel cell 24. The distribution manifold 25 re-routes anode (reformate) and cathode (oxidant) flow channels from a pattern that is compatible with the fuel cell stack portion 88 to a pattern that is compatible with the waste energy recovery portion's 26 heat transfer plates. Within the distribution manifold 25, a reformate control valve (not shown) can be implemented to control the quantity of the reformate entering the fuel cell stack portion 88 from the waste energy recovery portion 26.

The distribution manifold 25 integrates the waste energy recovery portion 26 and the fuel cell stack portion 88 to provide a fuel cell 24 having integral waste energy recovery portion. The integration of the fuel cell stack portion and the waste energy recovery portion is an important feature.

Figure 3:
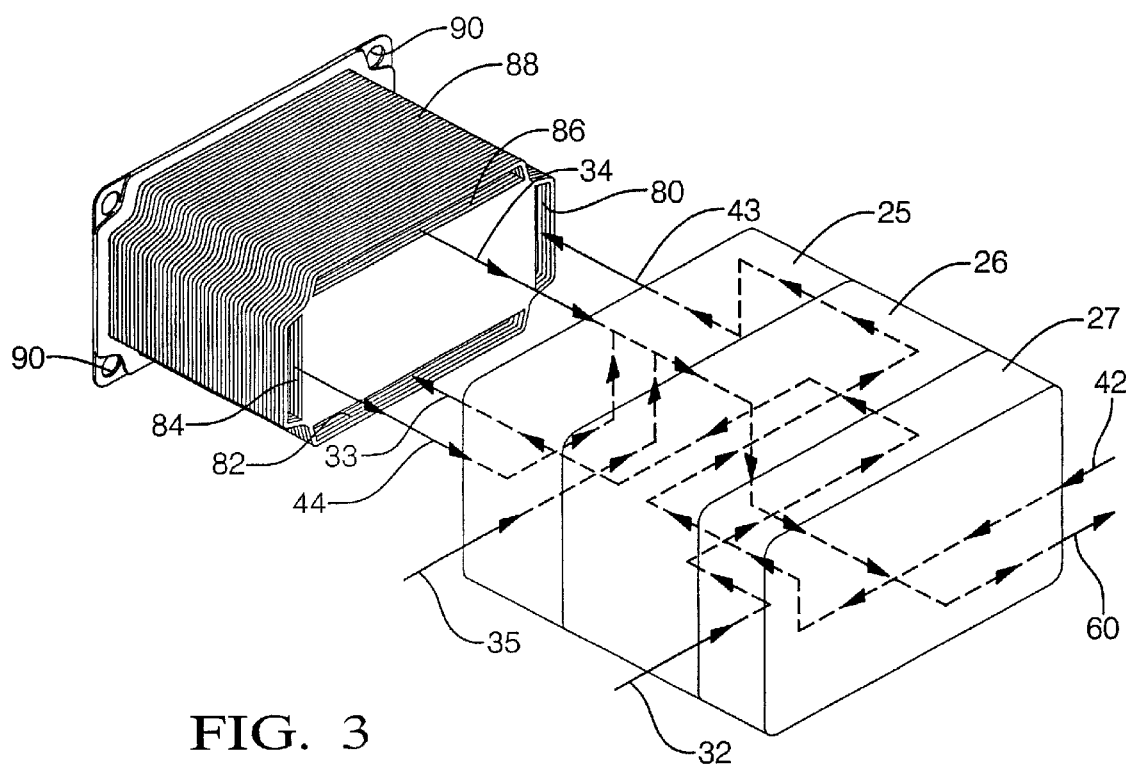
FIG. 3 is a perspective view of the fuel cell of FIG. 2 illustrating flow of gasses therethrough.

Referring to FIG. 3, the output of the fuel cell stack portion 88 (i.e., anode exhaust 44 and cathode exhaust 34) are routed back to the waste energy recovery portion 26 catalytic combustor to be mixed with an exterior supply of air 35 and burned. The catalytic combustion zones heat the heat exchangers of the waste energy recovery portion 26. During periods of high temperature operation of the waste energy recovery portion 26 (high load), cooler air can be added to the cathode supply output to blend and control the temperature to the fuel cell modules.

The waste energy recovery portion 26 may comprise a series of connected plate structures. The plates have opening and defined flow channels to direct the flow of oxidant, reformate, and exhaust gases therethrough, whereby the heat of the exhaust gases is transferred through the plates to heat the oxidant and reformate. The plates can comprise an arrangement of stacked plates such as described in U.S. patent application Ser. No. 09/838,677 (Attorney Docket No. DP-302922; DEP-0183) filed concurrently herewith, which is incorporated herein by reference.

In operation, the anode supply 42 is introduced at a supply (anode supply) inlet of the inlet/outlet manifold 27 through a passage to the waste energy recovery portion 26 where it is routed through pre-heated flow channels. The cathode supply 32 from the process air supply is also introduced at a process air (cathode supply) inlet of the inlet/outlet manifold 27 through a passage to the waste energy recovery portion 26 where it is routed to a parallel, but separate from the reformate flow channels, set of pre-heated flow channels.

Within the waste energy recovery portion 26, the gasses are heated by the heat transfer plates to a temperature for use in the fuel cell stack portion 88. Excess heat from the fuel cell stack portion exhaust gases (i.e., anode exhaust 44 and cathode exhaust 34) is transferred to the anode supply 42 and cathode supply 32 through the heat transfer plates of the waste energy recovery portion 26.

The heated anode supply 43 and cathode supply 33 are routed through passages of the distribution manifold 25 to the fuel cell stack portion 88 via the anode supply manifold 80 and cathode supply manifold 82 of the fuel cell stack portion 88. When stacking cells to create the fuel cell stack portion 88, interconnects (or current collectors) are disposed adjacent to the cells to provide electrical communication between the cells. The fuel cell stack portion 88 comprises a series of cell modules located between these interconnects. The interconnects are typically, but not limited to, flat plate structures and can have one or more flow sections (commonly referred to as manifolds) that border the edge of the interconnect and are open to the flow of oxidant or fuel. The anode supply manifold (opening) 80, cathode supply manifold (opening) 82, anode exhaust manifold (opening) 84, and cathode exhaust manifold (opening) 86 are illustrated in FIG. 3.

The cathode exhaust 34, and thermal energy, is mixed with the anode exhaust 44, and thermal energy, and combusted in the distribution manifold 25. The mixed exhaust and byproducts 60 are then routed to the high temperature flow channels in the waste energy recovery portion 26. A supply of exterior air 35, from e.g., the process air supply, can be introduced into the mixed exhaust and byproducts 60 for controlling the temperatures in the waste energy recovery portion 26. The heat transfer plates within the waste energy recovery portion 26 absorb thermal energy. The exhaust leaving the waste energy recovery portion 26 is routed through passages in the inlet/outlet manifold 27 and exits via an exhaust outlet to the exterior environment.

Since the fuel cell stack portion, the distribution manifold, the waste energy recovery portion, and the inlet/outlet manifold are thermally compatible and complementary, the integration simplifies thermal management of the fuel cell system. Integrating these two systems (the fuel cell stack portion and the waste energy recovery portion) reduces manufacturing cost, package size and mass, and improves reliability by eliminating pipes and connections between the subsystems.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A fuel cell, comprising:
   a fuel cell stack portion having supply and exhaust openings;
   a waste energy recovery portion having flow channels defined therein, said waste energy recovery portion having supply and exhaust openings; and
   a distribution manifold integrally connecting said fuel cell stack portion with said waste energy recovery portion, said distribution manifold having supply and exhaust passages therethrough, said supply passages of said distribution manifold interconnecting said supply openings of said fuel cell stack portion with said supply openings of said waste energy recovery portion, said exhaust passages of said distribution manifold interconnecting said exhaust openings of said fuel cell stack portion with said exhaust opening of said waste energy recovery portion.

2. The fuel cell of claim 1, further comprising:
   an inlet/outlet manifold having supply and exhaust passages therethrough, said supply passages interconnecting said supply openings of said waste energy recovery portion with supply inlets of said inlet/outlet manifold, said exhaust passage interconnecting said exhaust opening of said waste energy recovery portion with an exhaust outlet of said inlet/outlet manifold.

3. The fuel cell of claim 1, wherein said distribution manifold further comprises:
   a temperature control supply passage interconnecting said exhaust passage with a temperature control supply inlet of said distribution manifold.

4. The fuel cell of claim 1, wherein:
   said supply openings in said fuel cell include an anode supply opening and a cathode supply opening;
   said supply openings in said waste energy recovery portion include an anode supply opening and a cathode supply opening;
   said supply passages in said distribution manifold include an anode supply passage and a cathode supply passage, said anode supply passage of said distribution manifold interconnecting said anode supply opening of said fuel cell stack portion with said anode supply opening of said waste energy recovery portion, said cathode supply passage of said distribution manifold interconnecting said cathode supply opening of said fuel cell stack portion with said cathode supply opening of said waste energy recovery portion.

5. The fuel cell of claim 1, further comprising:
   a plurality of fasteners cooperating with said fuel cell stack portion, said distribution manifold, and said waste energy recovery portion to integrally retain said fuel cell stack portion, said distribution manifold, and said waste energy recovery portion together.

6. The fuel cell of claim 1, further comprising:
   a plurality of fasteners cooperating with said fuel cell stack portion, said distribution manifold, said waste energy recovery portion, and said inlet/outlet manifold to integrally retain said fuel cell stack portion, said distribution manifold, said waste energy recovery portion, and said inlet/outlet manifold together.

7. The fuel cell of claim 4, further comprising:
   a valve associated with said distribution manifold for regulating flow in said anode supply passage of said distribution manifold.

8. A method of directing flow in a fuel cell, comprising:
   communicating an exhaust from a fuel cell stack portion to a waste energy recovery portion through a distribution manifold, said distribution manifold integrally connecting said fuel cell stack portion and said distribution manifold;

communicating an oxidant received from a supply to said fuel cell stack portion through said waste energy recovery portion and said distribution manifold;

communicating a reformate received from a supply to said fuel cell stack portion through said waste energy recovery portion and said distribution manifold; and whereby said oxidant and said reformate are heated.

9. The method of claim 8, further comprising controlling temperature of said exhaust from a fuel cell stack portion to said waste energy recovery portion at said distribution manifold.

10. The method of claim 8, further comprising regulating flow of said reformate at said distribution manifold.

* * * * *